(No Model.)

J. T. MITCHELL.
PULLEY.

No. 408,632. Patented Aug. 6, 1889.

WITNESSES:
Fred G. Dieterich
P. B. Turpin.

INVENTOR:
J. T. Mitchell
BY Munn &Co.
ATTORNEYS.

UNITED STATES PATENT OFFICE.

JOSEPH T. MITCHELL, OF SHELBYVILLE, TENNESSEE, ASSIGNOR OF TWO-THIRDS TO JOHN N. SULLIVAN AND JOHN R. WALLACE, TRUSTEE, OF SAME PLACE.

PULLEY.

SPECIFICATION forming part of Letters Patent No. 408,632, dated August 6, 1889.

Application filed September 4, 1888. Serial No. 284,534. (No model.)

*To all whom it may concern:*

Be it known that I, JOSEPH T. MITCHELL, of Shelbyville, in the county of Bedford and State of Tennessee, have invented a new and useful Improvement in Pulleys, of which the following is a specification.

This invention is an improvement in pulleys; and it consists in certain constructions and combinations of parts, as will be hereinafter described and claimed.

Figure 1:
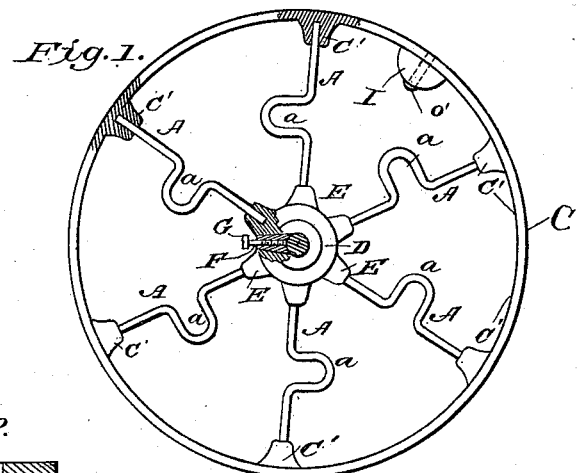
Figure 2:
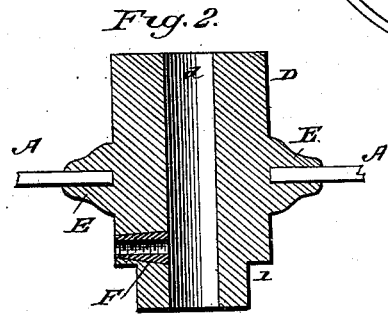
Figure 3:
Figure 4:
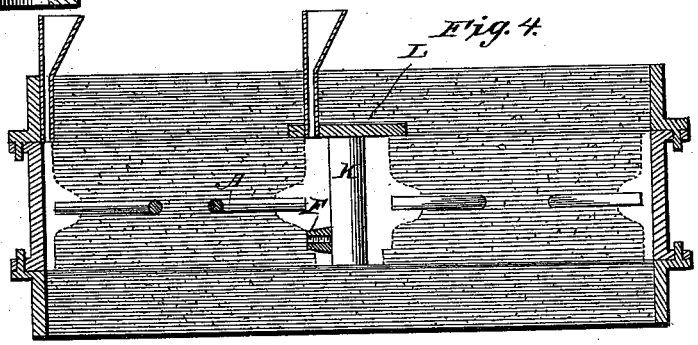
Figure 5:
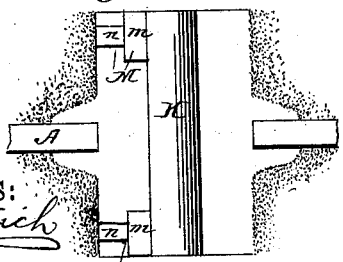
Figure 6:

In the drawings, Figure 1 is a face view of my pulley, parts being broken away to show the ends of some of the spokes and the nut in the hub. Fig. 2 is a sectional view of the hub, showing the nut therein. Fig. 3 is a detail view of one of the spokes with the pattern-bosses thereon. Fig. 4 is a cross-sectional view of the mold ready for the hub and rim to be cast. Fig. 5 shows a modification, and Fig. 6 is a detail view of the counterpoise.

The pulley has arms or spokes A, which are usually bent at $a$, as shown, to relieve the cast piece and hub of strain, and such spokes are preferably formed of wrought-iron, with their ends fitted to receive the apertured patterns B, which form the cavities in the mold for the bosses on the cast rim C and cast hub D. The hub D is cast with a central or axial bore $d$ and with bosses E. At one end the hub is usually formed with a portion 1 of less diameter than the body of the hub. Within this hub is embedded or cast the apertured nut F, the threaded bore of which forms a bearing for the set-screw G, which secures the pulley to its shaft. By embedding the nut in the hub I avoid the drilling and tapping of the hub, which is ordinarily required.

In connection with the pulley I shall describe the method of making same and the mold used for such purpose. It will be understood, however, that I do not claim such method in this application, for the reason that it forms the subject-matter of a separate application for patent, Serial No. 219,150, filed by me November 17, 1886.

The mold is preferably formed in a flask, as shown in Fig. 4, which may be formed in three parts, as shown, or be otherwise suitably constructed. The central section is formed of metal and forms a chill surface against which to cast the rim of the pulley.

The pulley as completed is formed, as will be seen in Fig. 1, of the rim C, having bosses C' projected inward from it, the hub D, having outwardly-projected bosses E, the nut F, embedded in said hub, and the spokes having their ends held in sockets in the bosses E C'.

It will be understood that I provide suitable patterns for the rim and hub of the pulley, which patterns may be inserted in the mold, and sand be filled around the same to a proper height to support the spokes, which are then put in position with the boss-patterns B thereon, as shown in Fig. 3. The mold may then be filled, after which, by properly lifting the flask-sections and the hub-pattern, the boss-patterns may be removed, the core K and the nut F be replaced in the hub-cavity, the plate L placed thereon, and the sections of the mold be fitted together, as shown in Fig. 4. By pouring the metal into the hub and rim cavities the rim will be cast with its exterior surface chilled and the bosses on its inner side surrounding the outer ends of the spokes, and the hub will be cast with the axial bore, with the embedded nut, and with the bosses surrounding the inner ends of the spokes. Sometimes as many as four set-screws are used in one pulley-hub, in which case the number of nuts cast therein would be increased; or a single nut might be employed, such nut being increased in length in line with the axis of the pulley and having a number of threaded openings.

In the construction before described the nut serves as a core for forming the cavity or recess in which it rests. Now, it will be understood that instead of embedding the nut in the hub it may be preferred to carry out this feature of my invention in the manner illustrated in Fig. 5, in which is shown core M, having head $m$, corresponding to the shape of and adapted to receive the nuts. A shank or stem $n$ extends from the head $m$ to the body of same in the flask. After the pulley has been cast the removal of the core M leaves a cavity fitted to receive a nut, the stem forming an opening through which the set-screw may be passed into the opening of the nut.

By chilling the surface of the rim it may be formed perfectly true, and the necessity of turning such face will be obviated, resulting in a considerable saving of cost in the manufacture of the pulleys. In successfully casting the pulley with a chilled rim the spokes or arms having a portion bent or looped in a direction out of their general line perform an important function, in that they are able to stand the strain of shrinkage, and the rim will be relieved of the warping and distortion which would be incident to the exertion of such strain thereon.

To balance the pulley, I employ an iron cup or cups I, cast with a hollow or cavity and having points $i$ projected therein to hold lead, Babbitt metal, or the like, melted and poured therein to bring the cups to the desired weights. The cup is secured to the inside of the rim of the pulley by riveting it to peg or pin O′, cast in the rim. Such pegs are usually provided between each two spokes, and the pegs not used may be cut off.

In bringing the balance to the proper weight the cup may be placed on a scale and lead poured therein till it reaches the desired weight, when it can be secured to the peg on the pulley.

In more specifically describing the cup I and the manner of securing the same, such cup may be said to be provided with a central opening I′, and the pin O′ is a wrought-iron peg or pin cast in the rim. When the cup has been properly weighted and applied, the pin O′ extends through the opening I′, and is swaged or riveted at $o$ to secure the cup in position, as will be understood from Figs. 1 and 6 of the drawings.

Having thus described my invention, what I claim as new is—

1. The combination, with a pulley having a pin O′, of a balance-cup having points $i$ and adapted to contain metal and secured to pin O′, substantially as set forth.

2. A pulley having a hub, a rim of cast metal, and wrought-iron spokes, such spokes being formed with loops or bends $a$ in a common plane with the body of the spokes and with the rim, substantially as set forth.

3. The improved pulley herein described, having its hub and rim provided with socketed bosses, and the spokes held at their ends in said sockets and formed with loops or bends $a$, such bends or loops being arranged in a common plane with the body of the spokes and with the rim, substantially as and for the purposes specified.

JOSEPH T. MITCHELL.

Witnesses:
H. M. JORDAN,
F. REDDICK.